(12) United States Patent
Hannemann et al.

(10) Patent No.: US 6,301,873 B2
(45) Date of Patent: Oct. 16, 2001

(54) GAS TURBINE AND STEAM TURBINE INSTALLATION

(75) Inventors: Frank Hannemann, Spardorf; Ulrich Schiffers, Eckental, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/789,774

(22) Filed: Feb. 20, 2001

Related U.S. Application Data

(63) Continuation of application No. PCT/DE99/02440, filed on Aug. 4, 1999.

(30) Foreign Application Priority Data

Aug. 17, 1998 (DE) .............................................. 198 37 251

(51) Int. Cl.$^7$ .................................................. F02B 43/00
(52) U.S. Cl. ........................ 60/39.12; 60/39.192; 60/728
(58) Field of Search ............................. 60/39.12, 39.182, 60/728, 39.53

(56) References Cited

U.S. PATENT DOCUMENTS

| | | |
|---|---|---|
| 5,319,924 | 6/1994 | Wallace et al. . |
| 5,388,395 * | 2/1995 | Scharpf et al. ...................... 60/39.02 |
| 6,032,456 * | 3/2000 | Eason et al. ........................ 60/39.02 |
| 6,141,796 * | 11/2000 | Cummings ........................ 60/39.464 |
| 6,237,321 * | 5/2001 | Schmid et al. ..................... 60/39.02 |

FOREIGN PATENT DOCUMENTS

| | | |
|---|---|---|
| 43 21 081 A1 | 1/1995 | (DE) . |
| 0 234 984 A | 2/1991 | (GB) . |

* cited by examiner

*Primary Examiner*—Charles G. Freay
(74) *Attorney, Agent, or Firm*—Herbert L. Lerner; Laurence A. Greenberg; Werner H. Stemer

(57) ABSTRACT

A gas turbine and steam turbine installation has a waste-heat steam generator whose heating surfaces are connected into the water/steam cycle of the steam turbine. A gasification device is connected upstream of the gas turbine in order to provide an integrated gasification of a fossil fuel. Reliable operation of a saturator which is connected into a fuel line is ensured independently of the operating condition of the gasification device. For this purpose, a saturator-water heat exchanger connected with its secondary side into the saturator cycle is supplied, on its primary side, with feed water extracted from the water/steam cycle of the steam turbine. Thus it is possible to heat the feed water cooled in the saturator-water heat exchanger through the use of a partial flow of compressed air, and it is possible to supply the partial flow of compressed air to an air separation unit connected upstream of the gasification device.

4 Claims, 2 Drawing Sheets

GAS TURBINE AND STEAM TURBINE INSTALLATION

CROSS-REFERENCE TO RELATED APPLICATION

This application is a continuation of copending International Application No. PCT/DE99/02440, filed Aug. 4, 1999, which designated the United States.

BACKGROUND OF THE INVENTION

Field of the Invention

The invention relates to a gas turbine and steam turbine installation with a waste-heat steam generator connected downstream of a gas turbine. The heating surfaces of the waste-heat steam generator are connected into the water/steam cycle of a steam turbine. A gasification device for gasifying fuel is connected, with a fuel line, upstream of a combustion chamber of the gas turbine. A saturator is connected into the fuel line. The gasified fuel is guided in counterflow to a water flow which is guided in a saturator cycle.

A gas turbine and steam turbine installation with integrated gasification of fossil fuel usually includes a fuel gasification device which is connected, at the outlet end, to the combustion chamber of the gas turbine via a number of components provided for gas cleaning. The waste-heat steam generator can then be connected downstream of the gas turbine, at a flue gas side. The heating surfaces of the waste-heat steam generator are connected into the water/steam cycle of the steam turbine. Such an installation is known, for example, from Published UK Patent Application GB-A 2 234 984.

In order to reduce the pollutant emission during the combustion of the gasified fossil fuel, a saturator is connected, in this installation, into the fuel line between the gasification device and the combustion chamber of the gas turbine. The gasified fuel is loaded with water vapor in the saturator. For this purpose, the gasified fuel flows through the saturator in counterflow to a flow of water which is guided within a water cycle. This water cycle is designated as saturator cycle. In order to set a temperature level in the saturator which is sufficient for loading the gasified fuel with water vapor, heat is coupled into the saturator cycle by cooling the tapped or extracted air and/or by cooling the crude gas from the fuel gasification.

In this installation, however, the operation of the saturator depends on the operating condition of the gasification device and/or on the operating condition of an air separation unit connected upstream of the gasification device, so that this concept only has limited flexibility. With respect to control, furthermore, such a concept is comparatively complicated and therefore susceptible to failure.

U.S. Pat. No. 5,319,924 discloses to preheat, in a heat exchanger, the feed water to be fed into a saturator, wherein it is possible to provide the heat exchanger with uncleaned crude gas on the primary side. In addition, a saturator configured as a fuel humidifier is known from Published, Non-Prosecuted Patent Application DE 43 21 081 in which a heat exchanger, which is supplied with feed water on the primary side, is provided for preheating the saturator water.

In the article "Effiziente und umweltfreundliche Stromerzeugung im GUD-Kraftwerk mit integrierter Vergasung" [Efficient and environmentally friendly power production in a gas and steam power plant with integrated gasification] by G. Haupt in "Elektrotechnik und Informationstechnik" [Electrical engineering and information technology], AT, Springer Verlag, Vienna, Volume 113, No. 1,2 (Feb. 1996), pages 102–105, the heating in a heat exchanger of a water flow which is to be fed into a saturator is described. The water flow is heated in a heat exchange with feed water extracted from the water/steam cycle of the steam turbine and supplied in a dedicated reservoir ("flash tank") connected into a circulating circuit. A heat exchanger is connected into this circulating circuit and in the heat exchanger the feed water absorbs heat from a partial flow of compressed air, the air being appropriately cooled in the process.

SUMMARY OF THE INVENTION

It is accordingly an object of the invention to provide a turbine installation which overcomes the above-mentioned disadvantages of the heretofore-known turbine installations of this general type and which allows, in a particularly simple manner, reliable operation of the saturator even under different operating conditions.

With the foregoing and other objects in view there is provided, in accordance with the invention, a turbine installation, including:
 a gas turbine having a combustion chamber and a flue gas side;
 a steam turbine having a water/steam cycle;
 a waste-heat steam generator connected downstream of the flue gas side of the gas turbine, the waste-heat steam generator having heating surfaces connected into the water/steam cycle of the steam turbine;
 a fuel line;
 a gasification device for providing gasified fuel, the gasification device being connected upstream of the combustion chamber of the gas turbine via the fuel line;
 a saturator cycle for guiding a waterflow;
 a saturator connected into the saturator cycle and into the fuel line, the saturator guiding the gasified fuel in a counterflow to the water flow guided in the saturator cycle;
 a saturator-water heat exchanger connected, with a secondary side thereof, into the saturator cycle, the saturator-water heat exchanger being supplied, on a primary side thereof, with feed water extracted from the water/steam cycle of the steam turbine, the saturator-water heat exchanger heating the water flow and cooling the feed water;
 an air separation unit connected upstream of the gasification device;
 an air compressor;
 an extraction air line connecting the air compressor to the air separation unit for providing a partial flow of compressed air to the air separation unit;
 a feed water tank allocated to the waste-heat steam generator;
 a feed water line connecting the saturator-water heat exchanger at an outlet side thereof to the feed water tank; and
 a further heat exchanger connected with a primary side thereof in the extraction air line, the further heat exchanger being connected with a secondary side thereof into the feed water line, and the further heat exchanger heating the feed water and cooling the partial flow of compressed air.

In other words, the object of the invention is achieved by a saturator-water heat exchanger, which is connected on the secondary side into the saturator cycle to heat the water flow, and which can be supplied, on the primary side, with feed water extracted from the water/steam cycle of the steam turbine, wherein it is possible to heat the feed water cooled in the saturator-water heat exchanger through the use of a partial flow of compressed air, wherein it is possible to supply the partial flow of compressed air to an air separation unit connected upstream of the gasification device, and wherein it is possible to connect a further heat exchanger on the primary side in an extraction air line connecting the air compressor to the air separation unit in order to cool the partial flow of compressed air, the secondary side of the further heat exchanger is connected into a feed water line connecting the saturator-water heat exchanger at the outlet end to a feed water tank associated with the waste-heat steam generator.

According to another feature of the invention, the air separation unit has an inlet side and receives at the inlet side the partial flow of compressed air compressed in the air compressor associated with the gas turbine; and the gasification device receives oxygen from the air separation unit.

According to a further feature of the invention, the saturator cycle defines a flow direction for the water flow; and a feed line opens into the saturator cycle upstream of the saturator-water heat exchanger as seen in the flow direction of the water flow.

The invention is based on the consideration that a reliable operation of the saturator is made possible even when there are differing operating conditions, and therefore a particularly high flexibility of the gas turbine and steam turbine installation is achieved in that the saturator can be operated independently of the operating parameters of the gasification device and the air separation unit. In this connection, the coupling of the heat into the saturator cycle, in particular, should not take place directly through the use of a medium flowing out of the gasification device or through the use of tapped or extracted air flowing into the air separation unit. Instead of this, coupling of heat into the saturator cycle is, rather, provided through the use of a medium extracted from the water/steam cycle of the steam turbine, such that the operating parameters for the gasification device and/or the air separation unit, on the one hand, and the saturator, on the other, can be set independently of one another. The control devices necessary for operating these components can also, therefore, be comparatively simply constructed.

In a particularly advantageous further embodiment, oxygen from an air separation unit can be supplied to the gasification device, wherein the air separation unit can, for its part, be subjected at the inlet end to a partial flow of air compressed in an air compressor associated with the gas turbine, a further heat exchanger being connected on the primary side in an extraction air line connecting the air compressor to the air separation unit in order to cool the partial flow of compressed air, the secondary side of the further heat exchanger is connected into a feed water line connecting the saturator-water heat exchanger at the output end to a feed water tank associated with the waste-heat steam generator. Such a configuration ensures a particularly high installation efficiency. The feed water flowing to the saturator-water heat exchanger is initially cooled by the thermal coupling into the water flow guided in the saturator cycle. In the further heat exchanger connected on the feed water side downstream of the saturator-water heat exchanger, the cooled feed water then experiences reheating, wherein the partial flow of compressed air, also referred to as tapped air or extracted air, flowing to the air separation unit, is simultaneously cooled. Coupling of heat from the tapped air flow into the water/steam cycle of the steam turbine therefore occurs to provide a particularly large recovery of heat.

In order to compensate for losses in the water flow guided in the saturator cycle, for example because of the loading or charging of the gasified fuel with water vapor in the saturator, a feed line expediently opens into the saturator cycle, the entry location of the feed line into the saturator cycle being provided before the saturator-water heat exchanger, viewed in the flow direction of the water flow, in order to provide a particularly high installation efficiency in a particularly advantageous embodiment. With such a configuration, a particularly high transfer of heat from the feed water to the water flow guided in the saturator cycle is ensured. The feed water therefore flows out of the saturator-water heat exchanger with a particularly low temperature so that, particularly when the cooled feed water is used for cooling the tapped (extracted) air, a particularly effective cooling of the tapped air is also made possible.

The advantages achieved by the invention result from the fact that because of the coupling of heat into the saturator cycle through the use of feed water extracted from the water/steam cycle of the steam turbine, reliable operation of the saturator is made possible independent of the operating condition of the gasification device. In consequence, the gas turbine in particular can also be operated within specified parameter limits independent of the operating condition of the gasification device. Such a concept for coupling in heat is therefore particularly flexible and, in particular, is also independent of the integration concept, i.e. independent of the type of air supply for the air separation unit and the components employed for that purpose. Because of the use of the feed water, cooled due to the heat transfer to the water flow, for cooling the tapped air from the air separation unit, a particularly high installation efficiency is also ensured.

Other features which are considered as characteristic for the invention are set forth in the appended claims.

Although the invention is illustrated and described herein as embodied in a gas turbine and steam turbine installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1A:
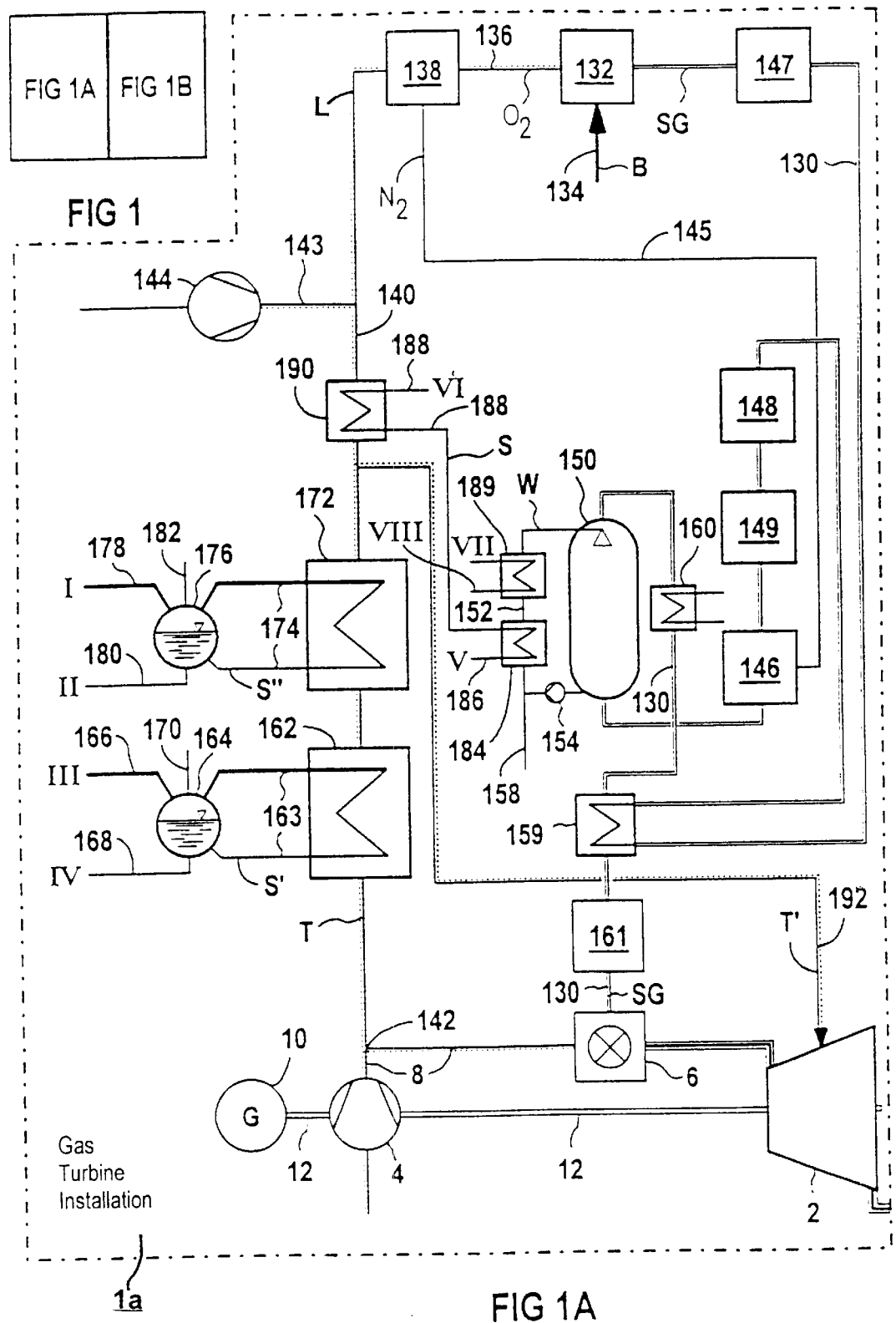
FIG. 1, which is composed of FIGS. 1a and 1b, is a schematic diagram of a gas turbine and steam turbine installation.
Figure 1B:
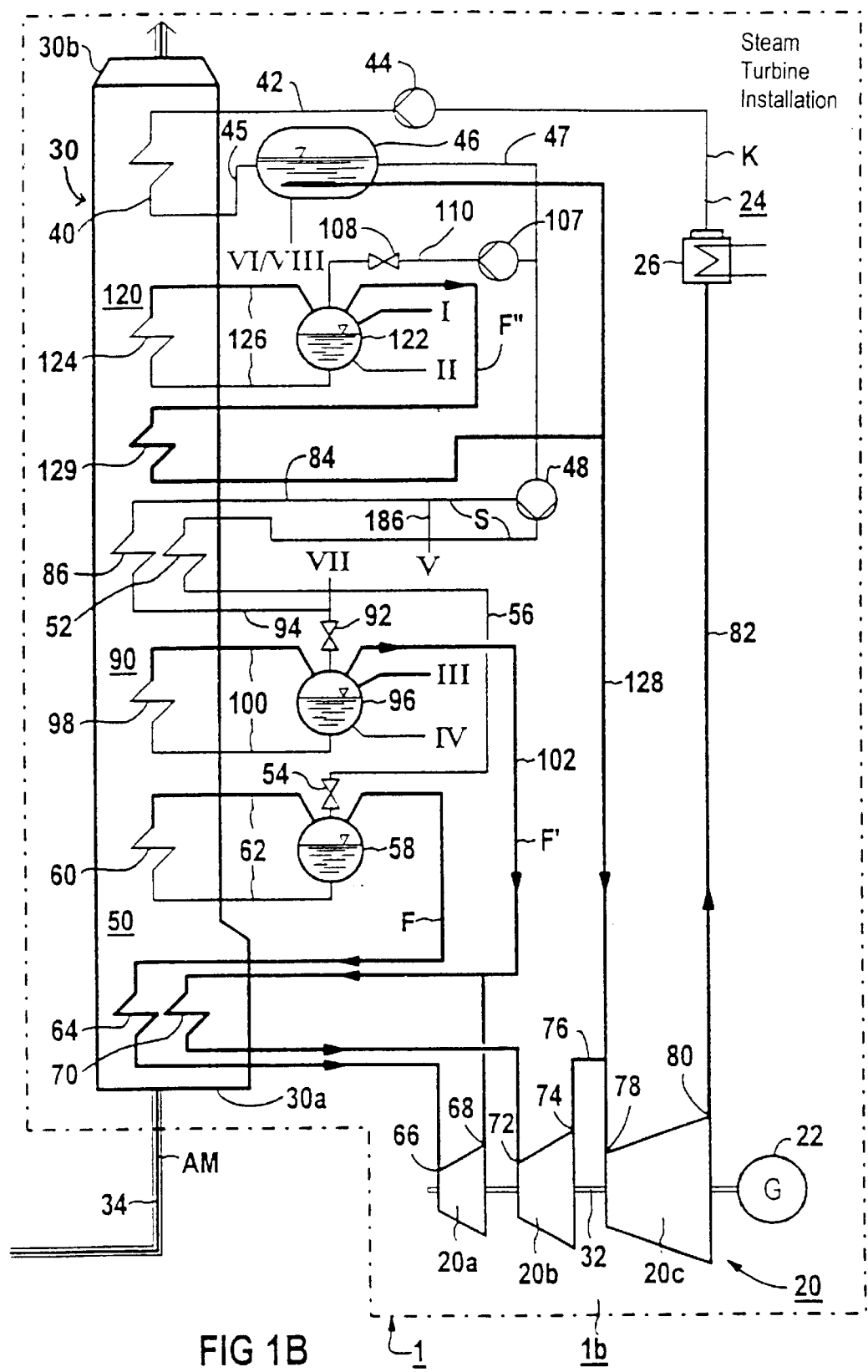

Referring now to the drawing in detail there is shown a gas turbine and steam turbine installation 1 which includes a gas turbine installation 1a and a steam turbine installation 1b. The gas turbine installation 1a includes a gas turbine 2 with, connected to it, an air compressor 4 and a combustion chamber 6, which is connected upstream of the gas turbine 2 and is connected to a compressed air line 8 of the compressor 4. The gas turbine 2, the air compressor 4 and a generator 10 are located on a common shaft 12. The steam turbine installation 1b includes a steam turbine 20 with, coupled to it, a generator 22 and, in a water/steam cycle 24, a condenser 26 and a waste-heat steam generator 30 connected downstream of the steam turbine 20. The steam turbine 20 consists of a first pressure stage or a high-pressure part 20a and a second pressure stage or a medium-pressure part 20b and a third pressure stage or a low-pressure part 20c, which drive the generator 22 via a common shaft 32.

An exhaust gas line 34 is connected to an inlet 30a of the waste-heat steam generator 30 in order to feed a working medium AM or flue gas expanded in the gas turbine 2 into the waste-heat steam generator 30. The expanded working medium AM from the gas turbine 2 leaves the waste-heat steam generator 30 via its outlet 30b in the direction of a chimney (not shown).

The waste-heat steam generator 30 includes a condensate preheater 40 which can be fed, at its inlet end, with condensate K from the condenser 26 via a condensate line 42, into which is connected a condensate pump unit 44. At its outlet end, the condensate preheater 40 is connected via a line 45 to a feed water tank 46. In order, if required, to bypass the condensate preheater 40, the condensate line 42 can, in addition, be connected directly to the feed water tank 46 via a bypass line (not shown). The feed water tank 46 is connected via a line 47 to a high-pressure feed pump 48, with medium pressure extraction.

The high-pressure feed pump 48 brings the feed water S flowing from the feed water tank 46 to a pressure level suitable for a high-pressure stage 50 of the water/steam cycle 24 associated with the high-pressure part of the steam turbine 20. The feed water S—which is at a high pressure—can be supplied to the high-pressure stage 50 via a feed water preheater 52 which, at its outlet end, is connected to a high-pressure drum 58 via a feed water line 56 which can be shut off by a valve 54. The high-pressure drum 58 is connected to a high-pressure evaporator 60 provided in the waste-heat steam generator 30 for the formation of a water/steam circuit 62. For the removal of the live steam F, the high-pressure drum 58 is connected to a high-pressure superheater 64 provided in the waste-heat steam generator 30, the high-pressure superheater 64 being connected at its outlet end to the steam inlet 66 of the high-pressure part 20a of the steam turbine 20.

The steam outlet 68 of the high-pressure part 20a of the steam turbine 20 is connected via a reheater 70 to the steam inlet 72 of the medium-pressure part 20b of the steam turbine 20. The steam outlet 74 of the medium-pressure part 20b is connected via a transfer line 76 to the steam inlet 78 of the low-pressure part 20c of the steam turbine 20. The steam outlet 80 of the low-pressure part 20c of the steam turbine 20 is connected via a steam line 82 to the condenser 26 so that a closed water/steam cycle 24 results.

In addition, a branch line 84 branches off from the high-pressure feed pump 48 at an extraction location at which the condensate K has reached a medium pressure. This branch line 84 is connected via a further feed water preheater 86 or medium-pressure economizer to a medium-pressure stage 90 of the water/steam cycle associated with a medium-pressure part 20b of the steam turbine 20. For this purpose, the second feed water preheater 86 is connected at its outlet end via a feed water line 94, which can be shut off by a valve 92, to a medium-pressure drum 96 of the medium-pressure stage 90. The medium-pressure drum 96 is connected to a heating surface 98 provided in the waste-heat steam generator 30 and configured as a medium-pressure evaporator in order to form a water/steam circuit 100. For the removal of medium-pressure live steam F', the medium-pressure drum 96 is connected via a steam line 102 to the reheater 70 and therefore to the steam inlet 72 of the medium-pressure part 20b of the steam turbine 20.

A further line 110, which is provided with a low-pressure feed pump 107, which can be shut off by a valve 108 and which is connected to a low-pressure stage 120 of the water/steam cycle 24 associated with the low-pressure part 20c of the steam turbine 20, branches off from the line 47. The low-pressure stage 120 includes a low-pressure drum 122, which is connected, in order to form a water/steam circuit 126, to a heating surface 124 provided in the waste-heat steam generator 30 and configured as a low-pressure evaporator. In order to remove low-pressure live steam F'', the low-pressure drum 122 is connected to the transfer line 76 via a steam line 128, into which is connected a low-pressure superheater 129. The water/steam cycle 24 of the gas turbine and steam turbine installation 1 therefore includes, in the exemplary embodiment, three pressure stages 50, 90, 120. As an alternative, however, fewer pressure stages, in particular two, can be provided.

The gas turbine installation 1a is configured for operation with a gasified synthesis gas SG which is generated by the gasification of a fossil fuel B. Gasified coal or gasified oil can, for example, be provided as the synthesis gas. For this purpose, the combustion chamber 6 of the gas turbine 2 is connected at its inlet end via a fuel line 130 to a gasification device 132. Coal or oil, as the fossil fuel B, can be supplied to the gasification device 132 via a charge system 134.

In order to make available the oxygen $O_2$ necessary for the gasification of the fossil fuel B, an air separation unit 138 is connected via an oxygen line 136 upstream of the gasification device 132. At its inlet end, the air separation unit 138 can be subjected to a partial flow T of the air compressed in the air compressor 4. For this purpose, the air separation unit 138 is connected, at its inlet end, to an extraction air line 140 which branches off from the compressed air line 8 at a branch location 142. A further air line 143, into which is connected an additional air compressor 144, also opens into the extraction air line 140.

In the exemplary embodiment, the total airflow L flowing to the air separation unit 138 is made up of the partial flow T branched off from the compressed air line 8 and the airflow delivered by the additional air compressor 144. Such a connection concept is also designated a partially integrated installation concept. In an alternative embodiment, the so-called fully integrated installation concept, it is possible to dispense with the further air line 143 and also with the additional air compressor 144 so that the complete air feed to the air separation unit 138 takes place through the use of the partial flow T extracted from the compressed air line 8.

The nitrogen $N_2$ obtained, in addition to the oxygen $O_2$, in the air separation unit 138 during the separation of the airflow L is supplied to a mixing appliance 146, via a nitrogen line 145 connected to the air separation unit 138, and is there mixed with the synthesis gas SG. The mixing appliance 146 is then configured for a particularly uniform and streak-free mixing of the nitrogen $N_2$ with the synthesis gas SG.

The synthesis gas SG flowing away from the gasification device 132 passes initially, via the fuel line 130, into a crude gas waste-heat steam generator 147 in which, through the use of heat exchange with a flow medium, cooling of the synthesis gas SG takes place. High-pressure steam generated during this heat exchange is supplied, in a manner not shown in any more detail, to the high-pressure stage 50 of the water/steam cycle 24.

Behind the crude gas waste-heat steam generator 147 and before the mixing appliance 146, viewed in the flow direction of the synthesis gas SG, a dust-removal device 148 for the synthesis gas SG and a desulphurization installation 149 are connected into the fuel line 130. In an alternative configuration, a soot-washing appliance can also be provided instead of the dust-removal device 148, in particular in the case of the gasification of oil as the fuel.

For particularly low pollutant emission during the combustion of the gasified fuel in the combustion chamber 6, the gasified fuel is loaded with water vapor before it enters into the combustion chamber 6. This can take place in a thermally particularly advantageous manner in a saturator system. For this purpose, a saturator 150, in which the gasified fuel is guided in counterflow relative to the heated water flow W (also referred to as saturator water), is connected into the fuel line 130. The saturator water or the water flow W then circulates in a saturator cycle 152, which is connected to the saturator 150 and into which a circulating pump 154 is connected. A feed line 158 is connected to the saturator cycle 152 to compensate for losses of saturator water occurring during the saturation of the gasified fuel.

The secondary side of a heat exchanger 159 acting as a crude gas/mixed gas heat exchanger is connected into the fuel line 130 behind the saturator 150, viewed in the flow direction of the synthesis gas SG. The primary side of the heat exchanger 159 is then likewise connected into the fuel line 130 at a position in front of the dust removal installation 148, so that the synthesis gas SG flowing to the dust removal installation 148 transfers a part of its heat to the synthesis gas SG flowing out of the saturator 150. The guidance of the synthesis gas SG via the heat exchanger 159 before it enters the desulphurization installation 149 can then also be provided in a modified connection concept relative to the other components. In the case of the connection of a soot-washing device, in particular, the heat exchanger can preferably be provided on the crude gas side downstream of the soot-washing device.

The secondary side of a further heat exchanger 160, whose primary side can be heated by feed water or also by steam, is connected into the fuel line 130 between the saturator 150 and the heat exchanger 159. Particularly reliable preheating of the synthesis gas SG flowing to the combustion chamber 6 of the gas turbine 2, even in the case of different operating conditions of the gas turbine and the steam turbine installation 1, is then ensured by the heat exchanger 159, which is configured as a crude gas/clean gas heat exchanger, and by the heat exchanger 160.

In order to subject the synthesis gas SG flowing to the combustion chamber 6 to steam, if required, a further mixing appliance 161 is, in addition, connected into the fuel line 130. Medium-pressure steam can be supplied to this further mixing appliance 161 via a steam line (not shown) in order, in particular, to ensure reliable gas turbine operation in the case of operational faults.

In order to cool the partial flow T of compressed air, also designated as tapped air or extracted air, to be supplied to the air separation unit 138, the primary side of a heat exchanger 162 is connected into the extraction air line 140, the secondary side of this heat exchanger 162 being configured as a medium-pressure evaporator for a flow medium S'. The heat exchanger 162 is connected to a water/steam drum 164, which is configured as a medium-pressure drum, in order to form an evaporator circuit 163. The water/steam drum 164 is connected to the medium-pressure drum 96 associated with the water/steam circuit 100 by lines 166, 168. As an alternative, the secondary side of the heat exchanger 162 can also be directly connected to the medium-pressure drum 96. In the exemplary embodiment, the water/steam drum 164 is therefore directly connected (see III, IV) to the heating surface 98, which is configured as a medium-pressure evaporator. In addition, a feed water line 170 is connected to the water/steam drum 164 in order to top up evaporated flow medium S'.

A further heat exchanger 172, whose secondary side is configured as the low-pressure evaporator for a flow medium S", is connected into the extraction air line 140 after the heat exchanger 162, viewed in the flow direction of the partial flow T of compressed air. The heat exchanger 172 is then connected to a water/steam drum 176, which is configured as a low-pressure drum, in order to form an evaporator circuit 174. In the exemplary embodiment, the water/steam drum 176 is connected (see I, II) to the low-pressure drum 122, which is associated with the water/steam circuit 126, via lines 178, 180 and is therefore directly connected to the heating surface 124, which is configured as a low-pressure evaporator. As an alternative, however, the water/steam drum 176 can also be connected in another suitable manner, wherein it is then possible to supply steam taken from the water/steam drum 176 to an auxiliary consumption unit as process steam and/or as steam for heating purposes. In a further alternative embodiment, the secondary side of the heat exchanger 172 can also be directly connected to the low-pressure drum 122. The water/steam drum 176 is, in addition, connected to a feed water line 182.

Each of the evaporator circuits 163, 174 can be configured as a forced circulation system, the circuit of the flow medium S' or S" being ensured by a circulating pump and the flow medium S', S" being at least partially evaporated in a heat exchanger 162 or 172 configured as an evaporator. In the exemplary embodiment, however, both the evaporator circuit 163 and the evaporator circuit 174 are respectively configured as natural circulation systems, the circulation of the flow medium S' or S" being ensured by the pressure differences arising during the evaporation process and/or by the geodetic configuration or positioning of the respective heat exchanger 162 or 172 and the respective water/steam drum 164 or 176. In this configuration, only a comparatively modestly dimensioned circulating pump (not shown) is respectively connected into the evaporator circuit 163 or into the evaporator circuit 174 for starting the system.

In order to couple heat into the saturation cycle 152 and therefore for setting a temperature in the water flow W sufficient for charging the synthesis gas SG with water vapor, a saturator-water heat exchanger 184 is provided which can be subjected on the primary side to feed water S from the feed water tank 46. For this purpose, the primary side of the saturator-water heat exchanger 184 is connected (see V), at the inlet end, via a line 186 to the branch line 84 and, at the outlet end, via a line 188 (see VI) to the feed water tank 46. The saturator-water heat exchanger 184 is then connected on the secondary side downstream, viewed in the flow direction of the water flow W, of the inlet of the feed line 158 into the saturator cycle 152.

For additional heating of the water flow W, if required, an additional heat exchanger 189 is connected into the saturator cycle 152 in the exemplary embodiment. The additional heat exchanger 189 is then subjected on the primary side (see VII, VIII) to preheated feed water from the medium pressure stage 90 of the water/steam cycle 24. The additional heat exchanger 189 can, however, also be dispensed with —depending on the specified emission values and/or combustion gas temperatures.

A further heat exchanger 190 is connected into the line 188 for reheating the cooled feed water S flowing from the saturator-water heat exchanger 184, this further heat exchanger 190 being connected on the primary side downstream of the heat exchanger 172 in the extraction air line 140. Such a configuration can achieve a particularly high heat recovery from the tapped (extracted) air and, therefore, a particularly high efficiency of the gas turbine and steam turbine installation 1.

A cooling air line 192, through the use of which a partial quantity T' of the cooled partial flow T can be supplied as cooling air to the gas turbine 2 for blade cooling, branches off from the extraction air line 140 between the heat exchanger 172 and the heat exchanger 190, viewed in the flow direction of the partial flow T.

Subjecting the saturator-water heat exchanger 184 to feed water S from the water/steam cycle 24 of the steam turbine 20 permits reliable operation of the saturator 150 independent of the operating condition of the air separation unit 138. The overall efficiency of the gas turbine and steam turbine installation 1 then benefits particularly from the fact that reheating of the feed water S cooled in the saturator-water heat exchanger 184 takes place in the additional heat exchanger 190. The invention thus ensures a reliable setting of the final temperature of the partial flow T flowing as tapped air to the air separation unit 138 and also ensures a simultaneous recovery of the heat carried in this partial flow for the energy generation process of the gas turbine and steam turbine installation 1.

We claim:

1. A turbine installation, comprising:
   a gas turbine having a combustion chamber and a flue gas side;
   a steam turbine having a water/steam cycle;
   a waste-heat steam generator connected downstream of said flue gas side of said gas turbine, said waste-heat steam generator having heating surfaces connected into said water/steam cycle of said steam turbine;
   a fuel line;
   a gasification device for providing gasified fuel, said gasification device being connected upstream of said combustion chamber of said gas turbine via said fuel line;
   a saturator cycle for guiding a waterflow;
   a saturator connected into said saturator cycle and into said fuel line, said saturator guiding the gasified fuel in a counterflow to the water flow guided in said saturator cycle;
   a saturator-water heat exchanger connected, with a secondary side thereof, into said saturator cycle, said saturator-water heat exchanger being supplied, on a primary side thereof, with feed water extracted from said water/steam cycle of said steam turbine, said saturator-water heat exchanger heating the water flow and cooling the feed water;
   an air separation unit connected upstream of said gasification device;
   an air compressor;
   an extraction air line connecting said air compressor to said air separation unit for providing a partial flow of compressed air to said air separation unit;
   a feed water tank allocated to said waste-heat steam generator;
   a feed water line connecting said saturator-water heat exchanger at an outlet side thereof to said feed water tank; and
   a further heat exchanger connected with a primary side thereof in said extraction air line, said further heat exchanger being connected with a secondary side thereof into said feed water line, and said further heat exchanger heating the feed water and cooling the partial flow of compressed air.

2. The turbine installation according to claim 1, wherein:
   said air separation unit has an inlet side and receives at said inlet side the partial flow of compressed air compressed in said air compressor associated with said gas turbine; and
   said gasification device receives oxygen from said air separation unit.

3. The turbine installation according to claim 1, wherein:
   said saturator cycle defines a flow direction for the water flow; and
   a feed line opens into said saturator cycle upstream of said saturator-water heat exchanger as seen in the flow direction of the water flow.

4. The turbine installation according to claim 2, wherein:
   said saturator cycle defines a flow direction for the water flow; and
   a feed line opens into said saturator cycle upstream of said saturator-water heat exchanger as seen in the flow direction of the water flow.

* * * * *